United States Patent [19]
Cross

[11] 3,902,582
[45] Sept. 2, 1975

[54] SAFETY GATE MECHANISM

[76] Inventor: Raymond E. Cross, 910 N. Greenbay Rd., Lake Forest, Ill. 60045

[22] Filed: July 12, 1974

[21] Appl. No.: 488,256

[52] U.S. Cl. .................... 192/135; 74/612; 100/53; 425/DIG. 45
[51] Int. Cl. ............................................. F16p 3/08
[58] Field of Search ............ 74/612, 613, 614, 615; 192/135; 425/151, 152, 153, DIG. 45; 164/152; 100/53

[56] References Cited
UNITED STATES PATENTS
1,412,974 4/1922 Selvig et al. ......................... 74/612
2,407,891 9/1946 McKinstry ........................... 74/615

*Primary Examiner*—Samuel Scott
*Assistant Examiner*—F. D. Shoemaker
*Attorney, Agent, or Firm*—Hume, Clement, Brinks, Willian, Olds & Cook, Ltd.

[57] ABSTRACT

A machine safety mechanism wherein the gate rotates in its own plane in about an axis extending transversely of the axis of movement of the movable die members, for example. In its "actuation-prevent" position, the gate is disposed at one end stop of a travel arc of 90°. In this position, the gate blocks access to the machine actuator console. In its "access-prevent" position, the gate has been rotated about its axis through its travel arc of 90° to an opposite end stop. In this position, the gate prevents access to an area between the closing machine parts, such as the die members, for example. The gate is constructed so the operator can see through it; i.e., in practice, it might be fabricated of heavy wire mesh in a frame or, in contrast, of a heavy plastic.

5 Claims, 3 Drawing Figures

PATENTED SEP 2 1975　　　3,902,582

SAFETY GATE MECHANISM

FIELD OF THE INVENTION

This invention is in the field of safety devices for machines. It relates more particularly to machines where a hazard is involved due to closing parts like the relatively movable die elements of a die casting machine, for example.

BACKGROUND OF THE INVENTION

There are numerous machines where an operator-actuated sequence of events includes the coming together of machine elements to perform the work function for which the machine is designed. For many years it was common for machines of this type to be completely devoid of safety devices which would prevent an operator from actuating the machine while one hand, for example, was in position to be mangled by the machine operation. Although there have been safety mechanisms to prevent such accidents available for many years, it is only in recent years that there has been a real flurry of activity in the area of machine safety. This is particularly true since the advent of the OSHA regulations.

Numerous safety gate mechanisms have now been developed for preventing an operator from reaching into a work area when the machine is operative or ready for operation. To-date, however, no such mechanisms which provide fail-proof reliability with simplicity and low cost have been devised.

SUMMARY OF THE INVENTION

It is an object of the present invention to provide a fail-proof safety gate mechanism for machines of the type wherein a hazard involved is due to closing parts, such as a die casting machine, for example. It is another object to provide a safety gate mechanism which prevents the machine operator from placing his hand or any part of his body between die members or the like when the machine is actuated. It is still another object to provide a mechanism of the aforedescribed character which is simple in construction and low in cost.

The foregoing and other objects are realized in accord with the present invention by providing a machine safety mechanism wherein the gate rotates in its own plane in about an axis extending transversely of the axis of movement of the movable die members, for example. In its "actuation-prevent" position, the gate is disposed at one end stop of a travel arc of 90°. In this position, the gate blocks access to the machine actuator console. In its "access-prevent" position, the gate has been rotated about its axis through its travel arc of 90° to an opposite end stop. In this position, the gate prevents access to an area between the closing machine parts, such as the die members, for example. The gate is constructed so the operator can see through it; i.e., in practice, it might be fabricated of a heavy wire mesh in a frame or, in contrast, of a heavy plastic. This facilitates seeing the actuator console when the gate mechanism is in its actuation-prevention position and the area between the opposing die members when it is in its access-prevent position.

In a modified form of the machine safety gate mechanism, the machine control circuit is also tripped by the gate to render it operative only when the gate is in its accessprevent position. If the gate is moved only a short distance out of its end stop position in access-prevent, the circuit is de-energized and the die members automatically separate.

BRIEF DESCRIPTION OF THE DRAWING

The invention, including its construction and method of operation, together with additional objects and advantages thereof, is illustrated more or less diagrammatically in the drawing, in which.

DESCRIPTION OF THE PREFERRED EMBODIMENT

Figure 1:
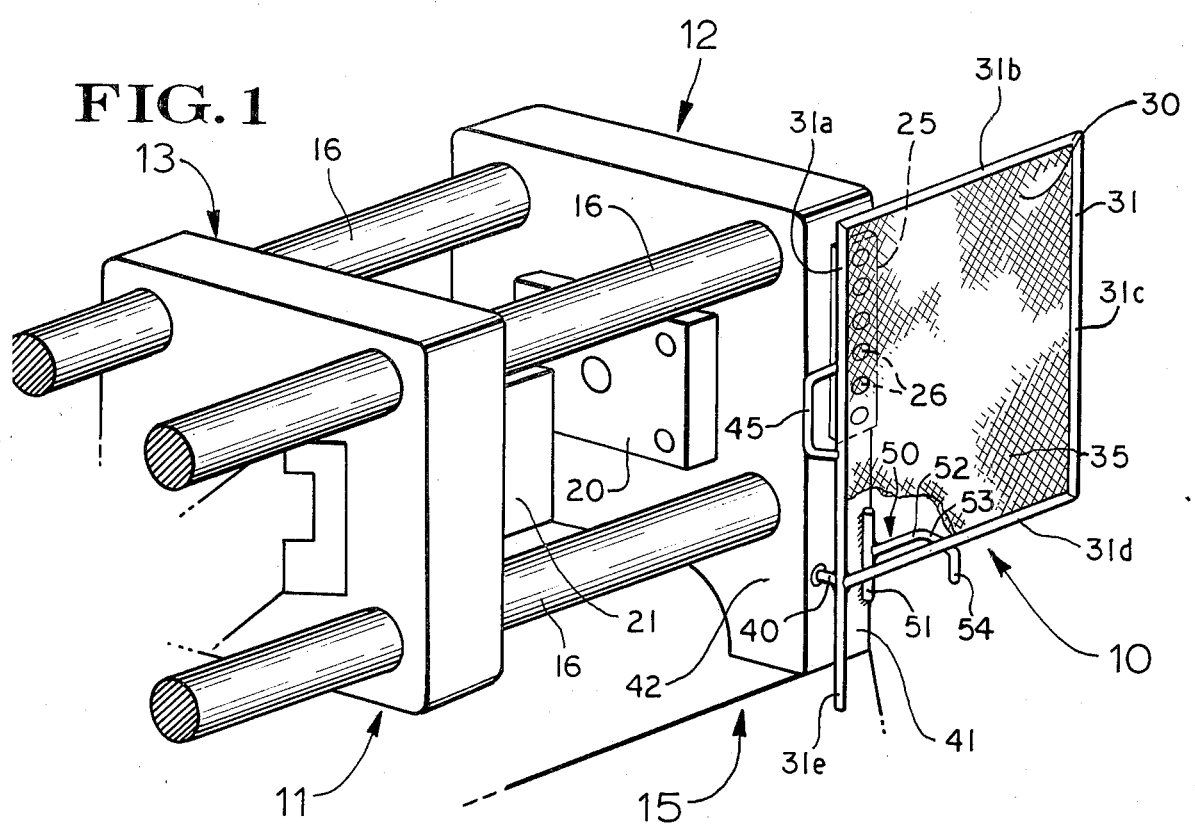
FIG. 1 is a perspective view of a die casting machine having a safety gate mechanism embodying features of the present invention, with the mechanism in its actuation-prevent position.
Figure 2:
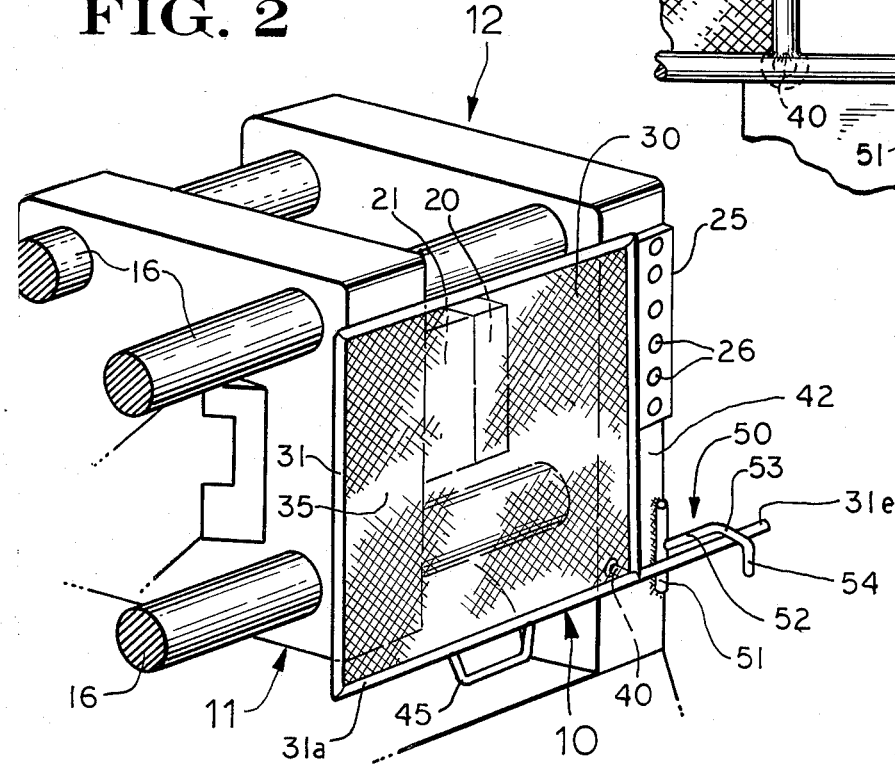
FIG. 2 is a perspective view of the machine and safety gate mechanism illustrated in FIG. 1, with the gate mechanism in its access-prevent position.

Referring now to the drawing, a safety gate mechanism 10 embodying features of the invention is illustrated in operative relationship on a conventional die casting machine 11. FIG. 1 illustrates the safety gate mechanism 10 in its actuator-prevent position, while FIG. 2 illustrates the same gate mechanism in its access-prevent position.

The die casting machine 11 includes a stationary die assembly 12 and a movable die assembly 13 mounted on a frame 15. The movable die assembly 13 slides on guide shafts 16 toward the fixed die assembly 12 to bring die elements 20 and 21 into mated relationship for the die casting operation.

The safety gate mechanism 10 embodying features of the present invention prevents the machine 11 from being actuated to bring the die elements 20 and 21 into mated relationship unless the gate mechanism is in its access-prevent position. As a result, the operator cannot put his hands or any other part of his body between the die assemblies 12 and 13 when the machine 11 is operable by the operator.

The die casting machine 11 is operated from a button console 25 by the operator to cause the movable die assembly 13 to close against the fixed die assembly 12. As illustrated, the console 25 has six operator buttons 26 in its complement. These buttons normally include a START button and a STOP button, as well as other buttons for conventional machine tool functions.

To operate the buttons 26, they must, of course, be accessible to the operator. According to the present invention, until the gate mechanism 10 is moved from its actuation-prevent position illustrated in FIG. 1 to its access-prevent position illustrated in FIG. 2, the operator cannot touch the console buttons 26; i.e., press the cycle START button, for example.

The safety gate mechanism 10 comprises a square or rectangular gate 30. The gate 30 comprises a border frame 31 fabricated of four steel strips 31a, 31b, 31c and 31d welded together at four corners. Fastened to the border frame 31 around its inner periphery is a sheet 35 of heavy wire mesh screen material. The mesh size is small enough to prevent the operator's finger or other instrument from penetrating it but large enough to clearly see through the sheet.

As has been pointed out, the frame strips 31a-d are joined together by welding in a conventional manner at four corners. Actually, this is true except for the juncture of strips 31a and 31b. There, as will be seen in FIG. 1, the strip 31a has a downwardly extending section 31e which protrudes from the corner. The significance of section 31e will hereinafter be explained.

At this same juncture of the strips 31a and 31d the frame 31 is rigidly secured by welding or the like to a mounting pin 40 extending perpendicular to the frame. To mount the gate 30 on the fixed die assembly 12 the mounting pin 40 is journalled in a suitably formed bearing aperture in the front vertical surface 41 of the die platen 42 in the fixed die assembly 12. The pin 40 is retained in its mounting aperture by conventional means and facilitates rotation of the gate 30 in its own plane about the axis of the pin.

After each casting operation, when the die elements 20 and 21 have separated, the operator rotates the gate 30 about its mounting pin 40 into the end stop position seen in FIG. 1. He does this by grasping the handle 45 on the frame strip 31a, as seen in FIG. 2, and rotating the gate 30 from its opposite end stop position seen in FIG. 2.

In its "actuation-prevent" position seen in FIG. 1, the gate 30 rests on an end stop arm 50 welded to the die platen face 42 in horizontal relationship. The arm 50 includes a vertical base element 51, a horizontal arm element 52 extending parallel to the direction of travel of the movable die assembly 13, a horizontal stop finger 53 extending parallel to the mounting pin 40, and a vertical catch element 54 extending downwardly from the free end of the stop fingers 53. The strip 31d of the gate 31 rests on the horizontal arm element 53 in this position.

The operator now has access to the die element area but cannot reach the console 25 with its actuator button 26. The die elements 20 and 21 can be inspected, treated or removed and replaced. The machine 10 cannot be accidentally actuated since the buttons 26 are covered.

To initiate a casting operation, the operator rotates the gate 30 about its mounting pin 40 into the end stop position seen in FIG. 2. Again, this is done by grasping the handle 45 and rotating the gate 30 in a counter-clockwise direction through an arc of 90° from the end stop position seen in FIG. 1.

In its "access-prevent" position seen in FIG. 2, the strip extension 31e of the gate frame 31 seats against and is stopped by the horizontal stop finger 53 on the end of stop arm 50. The vertical catch element 54 prevents this strip extension 31e from slipping off the free end of the stop finger 53.

The operator now has access to the console 25. Pressing the proper button 26, for example, on the actuator console 25, effective to cause the movable die assembly 13 to move the die element 21 into mating relationship with the die element 20. The normal casting operation is then effected.

Figure 3:
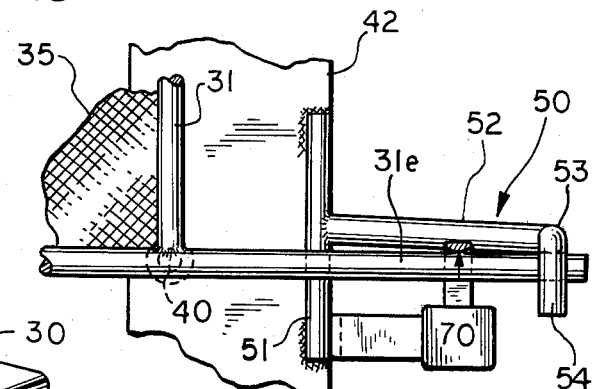
FIG. 3 is an enlarged front elevational view of a safety gate mechanism incorporating a machine circuit control modification.

In a modified form of gate mechanism embodying features of the invention, as seen in FIG. 3, the extending strip section 31e of the gate frame 31 is effective to bias a spring loaded switch 70 into its "ON" position when the gate 30 is in its access-prevent position (FIG. 2). The switch 70, when in its "ON" position, renders the electrical control circuit for the die casting machine 10 operative. Only when it is operative will pressing the close button 26 be effective to close the die assemblies 12 and 13.

Should the operator move the gate 30 even 5° from its end stop position as seen in FIG. 3 at access-prevent, the spring loaded switch 70 moves to its "OFF" position. The circuit is de-energized and the die assemblies automatically separate. Until the gate 30 is returned to its access-prevent position, the circuit remains de-energized.

While several embodiments described herein are at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. A safety gate mechanism for a machine wherein a hazard involved is due to closing machine parts or the like, comprising:
    a. a generally planar safety gate,
    b. said gate being mounted for rotation substantially in its own plane about a mounting axis extending generally perpendicular to the axis of movement of said closing parts, and
    c. machine actuator means,
    d. said gate being rotatable about said mounting axis between one end stop wherein the gate prevents access to said parts and an opposite end stop wherein the gate prevents access to said machine actuator means.

2. The safety gate mechanism of claim 1 further characterized in that:
    a. said gate is fabricated from material which permits the operator to view either said closing parts or said machine actuator means through said gate.

3. The safety gate mechanism of claim 2 further characterized in that:
    a. said gate is generally rectangular in configuration,
    b. said mounting axis extending through one corner of the rectangular gate.

4. The safety gate mechanism of claim 3 further characterized in that:
    a. said gate includes a rectangular frame defining its periphery,
    b. an arm extension protruding from one side of said frame, and
    c. stop means,
    d. said stop means being effective to engage said extension and provide said one end stop wherein the gate prevents access to said parts.

5. The safety gate mechanism of claim 4 further characterized by the including:
    a. circuit means for effecting the closing of said machine parts when said machine actuator means is manipulated in a predetermined manner,
    b. resiliently biased switch means normally urged toward opening said circuit means,
    c. said arm extension being effective to engage said switch means and move it to a position wherein said circuit is closed when said arm reaches said one end stop.

* * * * *